No. 12,479. REISSUED MAY 8, 1906.

A. PROCTOR.

HOLDER FOR LACEWORK.

APPLICATION FILED DEC. 11, 1905.

Inventor

Witnesses

T. L. Moorhouse

R. C. Braddock.

Augusta Proctor

By William W. Dyane her Attorney

ANDREW. B. GRAHAM CO., PHOTO-LITHOGRAPHERS, WASHINGTON, D. C.

UNITED STATES PATENT OFFICE.

AUGUSTA PROCTOR, OF VIROQUA, WISCONSIN.

HOLDER FOR LACEWORK.

No. 12,479. Specification of Reissued Letters Patent. Reissued May 8, 1906.

Original No. 744,610, dated November 17, 1903. Application for reissue filed December 11, 1905. Serial No. 292,103.

*To all whom it may concern:*

Be it known that I, AUGUSTA PROCTOR, a citizen of the United States, residing at Viroqua, in the county of Vernon and State of Wisconsin, have invented new and useful Improvements in Holders for Lacework, of which the following is a specification.

My invention has reference to holders for lacework, more particularly that kind of lacework known as "Teneriffe;" and it contemplates the provision of such a holder constructed with a view of facilitating manipulation of a needle or like implement in and out among the threads incident to the production of the lacework.

With this object in view the invention will be fully understood from the following description and claims, when taken in connection with the accompanying drawings, forming part of this specification, in which—

Figure 1:
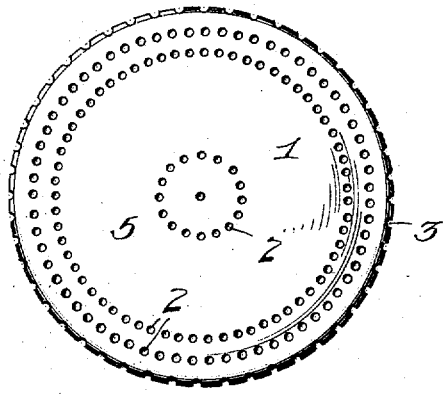
Figure 2:
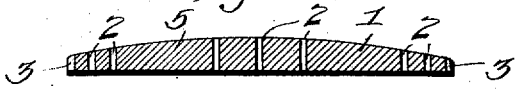
Figure 2:
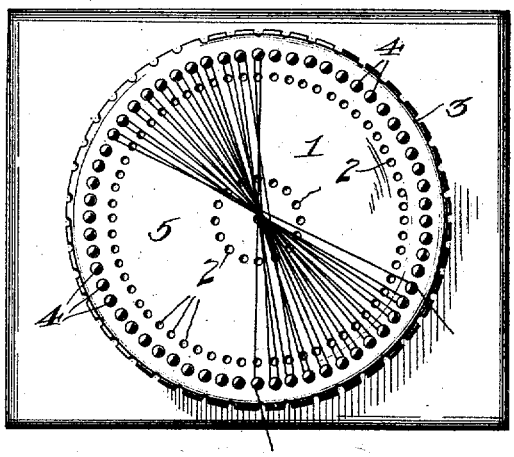

Figure 1 is a plan view of a holder constituting one embodiment of my invention; Fig. 2, a diametrical section of the same, and Fig. 3 a plan view showing a piece of lacework in process of formation on the holder.

Similar numerals designate corresponding parts in all of the views of the drawings, referring to which—

1 is my novel holder, which is in the form of a plate, preferably circular in outline, and is made of a suitable material possessing rigidity and lightness. The said plate is provided with one or more series of pin-receiving holes 2 grouped about its center, three series of holes being preferably provided and arranged as shown—*i. e.*, one series adjacent to the center of the plate and the other two series close together and adjacent to the periphery of the plate. I also prefer to provide the plate with a series of edge notches 3, designed to be employed in the same manner as the pin-receiving holes 2 in the making of a large size of lace wheel or disk, and also designed to be used in combination with the holes 2 in providing the lace with an irregular edge.

The holes 2 and notches 3 are designed to receive common headed pins 4, which are placed in the holes and pressed into a suitable supporting-body, whereby both the body and the pins will be retained in place during the making of lacework on the holder, the pins being arranged to project above the upper side of the plate to permit of working the threads thereover in the making of the lace according to any pattern that may be selected.

The upper surface 5 of the plate is convex—*i. e.*, rounded—from the center of the plate to its edge, which is of considerably less thickness than the center, as best shown in Fig. 2. This convex surface constitutes the salient feature of my invention inasmuch as it permits of a needle or like sharp-pointed implement being passed in and out in any direction among the threads and also permits of the threads being raised through the medium of the needle, without liability of the point of the needle sticking into the plate. From this it follows that the convex upper side of the plate contributes materially to the celerity with which lacework may be produced on the holder.

Having described my invention, what I claim, and desire to secure by Letters Patent, is—

1. As an article of manufacture, a holder for lacework, in the form of a plate, having a convex upper surface and also having a series of pin-receiving means extending throughout its thickness and grouped about its center.

2. As an article of manufacture, a holder for lacework, in the form of a plate, having a convex upper surface and also having a series of apertures extending throughout its thickness and arranged adjacent to and grouped about its center, and a second series of apertures extending throughout its thickness, grouped about its center and arranged adjacent to its periphery.

3. A patterning-holder for making lacework consisting of a plate convexed on its upper side and having a plurality of pin-receiving holes therethrough, the plate being notched at its peripheral edge.

4. A patterning-holder for making lacework consisting of a plate convexed on its upper side, a plurality of concentrically-arranged series of pin-receiving holes, one of said series of holes arranged at or near the center of the body, and the plate provided with a peripheral series of edge notches.

In testimony whereof I have signed my name to this specification in the presence of two subscribing witnesses.

AUGUSTA PROCTOR.

Witnesses:

NELLIE HAZEN,

WM. G. WEBB.